(12) United States Patent
Koito et al.

(10) Patent No.: US 12,287,086 B2
(45) Date of Patent: Apr. 29, 2025

(54) LIGHTING DEVICE

(71) Applicant: FUJIFILM Corporation, Tokyo (JP)

(72) Inventors: Naoki Koito, Kanagawa (JP); Yujiro Yanai, Kanagawa (JP); Makoto Kamo, Kanagawa (JP); Shinya Watanabe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/529,679

(22) Filed: Dec. 5, 2023

(65) Prior Publication Data

US 2024/0142086 A1   May 2, 2024

Related U.S. Application Data

(63) Continuation of application No. PCT/JP2022/022908, filed on Jun. 7, 2022.

(30) Foreign Application Priority Data

Jun. 29, 2021 (JP) .................................. 2021-107818

(51) Int. Cl.
   *F21V 9/20* (2018.01)
   *G02B 5/30* (2006.01)
   *F21Y 115/10* (2016.01)

(52) U.S. Cl.
   CPC .............. *F21V 9/20* (2018.02); *G02B 5/3016* (2013.01); *F21Y 2115/10* (2016.08)

(58) Field of Classification Search
   CPC .................................. F21V 9/20; G02B 5/3016
   See application file for complete search history.

(56) References Cited

U.S. PATENT DOCUMENTS

| 5,682,180 A | * | 10/1997 | Young | G02F 1/133533 |
| | | | | 349/97 |
| 2013/0286329 A1 | * | 10/2013 | Goto | G02B 5/3016 |
| | | | | 349/194 |
| 2019/0086698 A1 | | 3/2019 | Mizusaki et al. | |

FOREIGN PATENT DOCUMENTS

| JP | 3-36522 A | 2/1991 |
| JP | 4-232994 A | 8/1992 |

(Continued)

OTHER PUBLICATIONS

Devin Partida, "How to Test for Dead Pixels and Stuck Pixels", Jul. 30, 2019, https://rehack.com/tech-explained/how-to-test-for-dead-pixels/ (Year: 2019).*

(Continued)

*Primary Examiner* — Evan P Dzierzynski
*Assistant Examiner* — Nathaniel J Lee
(74) *Attorney, Agent, or Firm* — Edwards Neils LLC; Jean C. Edwards, Esq.

(57) ABSTRACT

A lighting device that can switch between intensity distributions of emitted light with a simple configuration. The lighting device includes a light source, a polarization controller, and a polarizing plate, in which the polarization controller switches light emitted from the light source between light components having two or more different polarization states to be incident into the polarizing plate, and the polarizing plate functions as a diffraction grating that has two or more regions having different polarization states of transmitted light in an in-plane direction and where one or more regions among the regions are periodically disposed.

4 Claims, 3 Drawing Sheets

(56) References Cited

FOREIGN PATENT DOCUMENTS

| | | |
|---|---|---|
| JP | 10-160932 A | 6/1998 |
| JP | 2006-091871 A | 4/2006 |
| JP | 2019-056825 A | 4/2019 |

OTHER PUBLICATIONS

International Search Report issued in PCT/JP2022/022908 on Aug. 9, 2022.
Written Opinion issued in PCT/JP2022/022908 on Aug. 9, 2022.
International Preliminary Report on Patentability completed by WIPO on Dec. 14, 2023 in connection with International Patent Application No. PCT/JP2022/022908.

* cited by examiner

LIGHTING DEVICE

CROSS-REFERENCE TO RELATED APPLICATIONS

This application is a Continuation of PCT International Application No. PCT/JP2022/022908 filed on Jun. 7, 2022, which was published under PCT Article 21 (2) in Japanese, and which claims priority under 35 U.S.C. § 119 (a) to Japanese Patent Application No. 2021-107818 filed on Jun. 29, 2021. The above applications are hereby expressly incorporated by reference, in their entirety, into the present application.

BACKGROUND OF THE INVENTION

1. Field of the Invention

The present invention relates to a lighting device that can switch between intensity distributions of emitted light.

2. Description of the Related Art

As a method for realizing autonomous driving of a vehicle, a distance measurement method using a technique called Light Detection And Ranging (LiDAR) is known.

This distance measurement method is called Time of Flight (TOF), in which, for example, laser light is emitted in a pulsed manner from a laser light source, and laser light reflected from an object is measured by a light-receiving element. The distance to the object is measured by detecting a phase difference based on a period of time between the emission of the laser light from the laser light source and the light reception by the light-receiving element. In addition, a position of the object can also be detected by scanning two-dimensionally or three-dimensionally the laser light.

On the other hand, a two-dimensional dot light source that emits light (dot light) called structured light in the form of a plurality of dots that are two-dimensionally arranged is used, for example, for face authentication or gesture recognition. For example, in a mobile electronic apparatus such as a smartphone, face authentication of a user is performed using the two-dimensional dot light source.

In the authentication or the like using the two-dimensional dot light source, the dot light that is two-dimensionally arranged is projected on the measurement object, and reflected light from the object is received by the light-receiving element. The face authentication or the like is performed by detecting a distance to the object, unevenness of a surface of the object, and the like based on a change in an interval and a dot arrangement (dot pattern) of the received dot light with respect to the irradiated dot light.

Accordingly, as long as the light source can switch between the single light source that emits single light to perform distance measurement using TOF and the two-dimensional dot light source that emits the dot light consisting of a plurality of dots that are two-dimensionally arranged, not only the distance measurement to the object but also the position detection and the three-dimensional shape recognition of the measurement object can be accurately performed.

Accordingly, JP2019-56825A describes a liquid crystal diffraction grating comprising: a pair of substrates each of which includes an electrode; a liquid crystal layer that is provided between the pair of substrates and includes a liquid crystal material; a seal material that is disposed to surround the liquid crystal layer; and an alignment control layer that is disposed in a region surrounded by the seal material and is disposed in contact with the liquid crystal layer between the liquid crystal layer and either or both of the pair of substrates; in which the alignment control layer aligns liquid crystal molecules in the liquid crystal material in a direction horizontal to the pair of substrates and includes a polymer obtained by polymerizing at least one monomer, an alignment direction of the liquid crystal molecules periodically rotates in at least one direction in a plan view of the liquid crystal layer in a horizontal alignment state where the liquid crystal molecules are aligned in the direction parallel to the pair of substrates, and the liquid crystal diffraction grating is switchable between a diffraction state and a transparent state depending on voltage application between the pair of electrodes of the pair of substrates.

SUMMARY OF THE INVENTION

In the liquid crystal diffraction element described in JP2019-56825A, in a state where light is incident into the liquid crystal diffraction element, the voltage application between the electrodes switches to switch the liquid crystal layer between the transparent state and the diffraction state. As a result, the liquid crystal diffraction element can switch between a single light source and a two-dimensional dot light source.

However, in the liquid crystal diffraction element described in JP2019-56825A, the liquid crystal layer needs to be patterned such that the alignment direction of the liquid crystal molecules changes at every predetermined angle and periodically rotates in the liquid crystal layer (liquid crystal cell). Therefore, the liquid crystal diffraction element has a complicated configuration and requires time and effort for manufacturing.

An object of the present invention is to solve the above-described problem of the related art and to provide, for example, a lighting device having a simple configuration that can switch between intensity distributions of emitted light, for example, between a single light source and a two-dimensional dot light source.

In order to achieve the object, a lighting device according to an aspect of the present invention has the following configurations.

[1] A lighting device comprising:
a light source;
a polarization controller; and
a polarizing plate,
in which the polarization controller switches light emitted from the light source between at least two different polarization states to be incident into the polarizing plate, and
the polarizing plate functions as a diffraction grating that has two or more regions having different polarization states of transmitted light in an in-plane direction and where one or more regions among the regions are periodically disposed.

[2] The lighting device according to [1],
in which the polarizing plate has the two or more regions where directions of absorption axes are different from each other.

[3] The lighting device according to [1] or [2],
in which the polarization controller is disposed on the light source side further than the polarizing plate and includes a polarizer and a liquid crystal cell in this order from the light source side.

[4] The lighting device according to any one of [1] to [3], in which the one or more regions of the polarizing plate include a dichroic substance.

[5] The lighting device according to [4], in which the one or more regions including the dichroic substance are regions where the dichroic substance is horizontally aligned.

[6] The lighting device according to [4] or [5], in which the one or more regions including the dichroic substance are regions where the dichroic substance is vertically aligned.

According to an aspect of the present invention, it is possible to provide a lighting device (light irradiating device) having a simple configuration that can switch between intensity distributions of emitted light.

DESCRIPTION OF THE PREFERRED EMBODIMENTS

Hereinafter, a lighting device according to the present invention will be described in detail based on preferable examples shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

Figure 1:
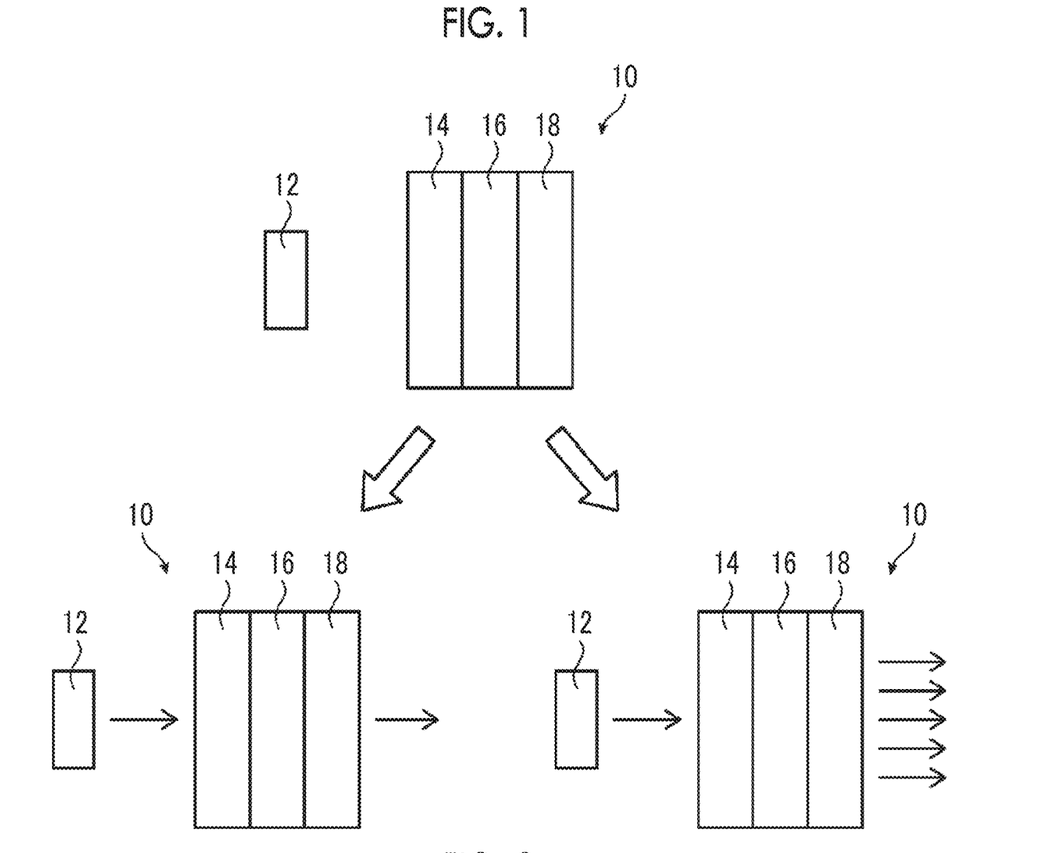
FIG. 1 is a diagram conceptually showing an example of a lighting device according to the present invention.

FIG. 1 is a diagram conceptually showing an example of the lighting device according to the embodiment of the present invention.

A lighting device 10 shown in FIG. 1 includes a light source 12, a polarizer 14, a liquid crystal cell 16, and a polarizing plate 18. The polarizer 14 and the liquid crystal cell 16 configure the polarization controller according to the embodiment of the present invention, and are disposed in this order from the light source 12.

The polarizer 14 and the liquid crystal cell 16, that is, the polarization controller switches light emitted from the light source 12 between at least two different polarization states to be incident into the polarizing plate 18. In the example shown in the drawing, the polarizer 14 and the liquid crystal cell 16 switches light emitted from the light source 12 to any of two linearly polarized light components orthogonal to each other to be incident into the polarizing plate 18.

In addition, the polarizing plate 18 functions as a diffraction grating (diffraction element) that has two or more regions having different polarization states of transmitted light in an in-plane and where one or more regions among the regions are periodically disposed. In the example shown in the drawing, the polarizing plate 18 has a periodic structure such as a checkered pattern where a first region 18a where a dichroic substance is horizontally aligned in one direction and a second region 18b where a dichroic substance is vertically aligned are alternately two-dimensionally arranged in directions orthogonal to each other in a plane (plane direction).

In the following description, in order to distinguish between the polarizer 14 and the polarizing plate 18 configuring the polarization controller, the polarizing plate 18 will also be referred to as the diffraction grating polarizing plate 18.

In the lighting device 10 according to the embodiment of the present invention, the liquid crystal cell 16 switches between polarization states of light incident into the diffraction grating polarizing plate 18. The lighting device 10 according to the embodiment of the present invention switches between the polarization states of the incidence light into the diffraction grating polarizing plate 18 to switch between a single light source on the left side that emits single light and a two-dimensional dot light source on the right side that emits light in the form of a plurality of dots that are two-dimensionally arranged as shown in the lower section of FIG. 1.

This point will be described below.

In the lighting device 10 according to the embodiment of the present invention, the light source 12 is not particularly limited, and various well-known light sources can be used.

Examples of the light source 12 include an electric lamp such as a mercury lamp or a halogen lamp, a fluorescent lamp, a light emitting diode (LED), and a laser such as a semiconductor laser.

In particular, for example, a LED or a semiconductor laser is suitably used.

The wavelength of light emitted from the light source 12 is not particularly limited and may be visible light or invisible light such as infrared light or ultraviolet light. In a case where light emitted from the light source 12 is visible light, the emitted light may be white light, red light, green light, or blue light. In particular, the infrared light is suitably used as the light emitted from the light source 12.

Further, the light emitted from the light source 12 may be unpolarized light or polarized light. In the lighting device 10 in the example shown in the drawing, the light source 12 emits, for example, unpolarized light.

Here, in the lighting device 10 according to the embodiment of the present invention, it is preferable that the light source 12 emits light having high directivity.

Specifically, it is preferable that the light source 12 emits light having a spread angle (beam spread angle) of 15° or less, it is more preferable that the light source 12 emits light having a spread angle of 5° or less, and it is still more preferable that the light source 12 emits light having a spread angle of 3° or less, and it is still more preferable that the light source 12 emits parallel light (collimated light).

The light spread angle is an angle (full width at half maximum angle) where a radiation intensity of light emitted from the light source changes from a radiation intensity maximum value to a value half of the maximum value.

The lighting device 10 functions as the single light source and the two-dimensional dot light source by using the polarization controller and the diffraction grating polarizing plate 18 that functions as a diffraction grating. In the lighting device 10, as the directivity of the light emitted from the light source 12 increases, the clear two-dimensional dot light (dot pattern) can be obtained.

In a case where the directivity of the light emitted from the light source 12 is low, a lens element that collects the light emitted from the light source 12 to improve the directivity of the light may be disposed between the light source 12 and the polarization controller.

The lens element is not particularly limited, and various optical elements that can collect diffused light to be approximated to parallel light can be used. Specific examples of the lens element include a convex lens, a collimating lens, and a beam collimator.

The light emitted from the light source 12 is incident into the polarizer 14 to be converted into linearly polarized light in one direction.

In the example shown in the drawing, the polarizer 14 converts, for example, the light emitted from the light source 12 into linearly polarized light in the same direction as the horizontal alignment direction of the dichroic substance in the first region 18a of the diffraction grating polarizing plate 18 described below.

As the polarizer 14, a well-known polarizer (linear polarizer) can be used as long as it converts the light into specific linearly polarized light. Accordingly, the polarizer 14 may be an absorptive or reflective type.

Examples of the polarizer 14 include an iodine-based polarizer, a colorant-based polarizer using a dichroic colorant, a polyene-based polarizer, a film obtained by stretching a dielectric multi-layer film, a wire grid polarizer, and a prism polarizer. Examples of the general absorptive linear polarizer include a polarizing plate 02 with a protective film on one surface (iodine-based polarizer) described in WO2015/166991A and an organic dichroic colorant-based polarizer described in JP2019-120949A.

The linearly polarized light transmitted through the polarizer 14 is subsequently incident into the liquid crystal cell 16.

The liquid crystal cell 16 is a well-known liquid crystal cell where a liquid crystal layer is provided between substrates each of which includes an electrode with a uniform surface (solid electrode), and induces a change in birefringence depending on voltage application from the electrodes. The liquid crystal cell 16 in the example shown in the drawing, the liquid crystal layer does not have an alignment pattern of a liquid crystal compound, the liquid crystal compound is uniformly aligned, and a uniform change in birefringence is induced on the entire cell surface depending on the voltage application.

Depending on the change in birefringence, the liquid crystal cell 16 optionally changes the polarization state of the linearly polarized light transmitted through the polarizer 14 and switches the transmitted linearly polarized light between the two different polarization states.

In the lighting device 10 in the example shown in the drawing, the liquid crystal cell 16 switches the linearly polarized light emitted from the polarizer 14 between the original transmitted state and a state where the liquid crystal cell 16 acts as a λ/2 wave plate such that the linearly polarized light emitted from the polarizer 14 is rotated by 90° and transmitted.

That is, the liquid crystal cell 16 (polarization controller) switches the transmitted light, that is, the light incident into the diffraction grating polarizing plate 18 between linearly polarized light in the same direction as the horizontal alignment direction of the dichroic substance in the first region 18a of the diffraction grating polarizing plate 18 and linearly polarized light orthogonal to the linearly polarized light.

Figure 2:
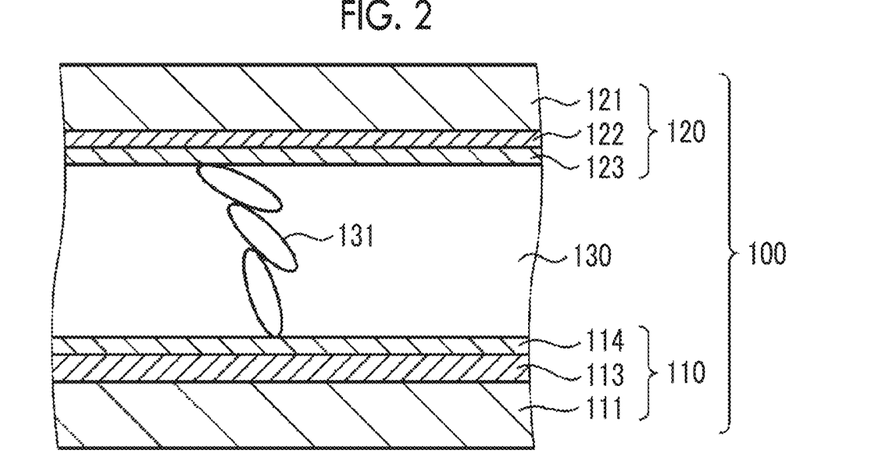
FIG. 2 is a diagram conceptually showing an example of a liquid crystal cell.

As the liquid crystal cell 16, various well-known cells can be used as long as they exhibit the above-described action, and preferable examples thereof include a liquid crystal cell 100 shown in FIG. 2.

The liquid crystal cell 100 shown in FIG. 2 includes a pair of substrates, that is, a first substrate 110 and a second substrate 120 and a liquid crystal layer 130 that is held between the pair of substrates. The liquid crystal cell 100 does not have a pixel structure.

More specifically, the first substrate 110 is formed using an insulating substrate 111 having light transmittance such as glass. The first substrate 110 includes a first common electrode 113 and an alignment film 114 on one main surface of the insulating substrate 111.

The first common electrode 113 is a so-called solid electrode that is uniformly provided on the entire main surface of the insulating substrate 111. The first common electrode 113 is formed of, for example, a conductive member having light transmittance such as indium tin oxide (ITO). The alignment film 114 is disposed to cover the entire main surface of the insulating substrate 111 and is formed of a material having light transmittance.

The main surface is the maximum surfaces of a sheet-shaped material (a plate-shaped material, a film, or a layer), that is, both surfaces in the thickness direction.

On the other hand, the second substrate 120 is also configured as in the first substrate 110 and includes a second common electrode 122 and an alignment film 123 on one main surface of an insulating substrate 121 having light transmittance such as glass.

Accordingly, likewise, the second common electrode 122 is uniformly provided on the entire main surface of the insulating substrate 121 and is formed of, for example, a conductive member having light transmittance such as ITO. The alignment film 123 is disposed to cover the entire main surface of the insulating substrate 121 and is formed of a material having light transmittance.

In the liquid crystal cell 100 having the above-described configuration, a retardation value of the liquid crystal cell during voltage non-application can be controlled by alignment control of one alignment film and the other alignment film. The one alignment film is, for example, the alignment film 114 on the first substrate 110 side, and the other alignment film is, for example, the alignment film 123 on the second substrate 120 side.

For example, both of the alignment film 114 and the alignment film 123 are horizontal alignment films and are disposed such that the alignment directions thereof are parallel to each other. As a result, a liquid crystal cell where liquid crystal molecules are homogeneously aligned can be configured.

Further, in the liquid crystal cell 100, liquid crystal molecules 131 are bent and aligned in a state where a relatively low level voltage Va (for example, 0 V) is applied to the liquid crystal layer 130. Therefore, the liquid crystal layer 130 has a retardation amount Rea in an in-plane direction and includes a retardation amount Rtha in a thickness direction.

On the other hand, the liquid crystal molecules 131 are arranged substantially perpendicular to the substrate except for the vicinity of the alignment film 123 in a state where a relatively high level voltage Vb (Va<Vb) is applied to the liquid crystal layer 130. Therefore, the liquid crystal layer 130 relaxes the effect of retardation by the liquid crystal molecules 131 in the in-plane direction. As a result, the liquid crystal layer 130 has a retardation amount Reb (Rea>Reb), whereas the effect of retardation by the liquid crystal molecules 131 in the thickness direction increases such that the liquid crystal layer 130 has a retardation amount Rthb (Rtha<Rthb).

This way, by controlling the retardation of the liquid crystal cell 100 (liquid crystal layer 130), incident polarized light can be controlled and emitted.

In the lighting device according to the embodiment of the present invention, the polarization controller is not limited to the configuration where the polarizer 14 and the liquid crystal cell 16 described above are used. That is, in the present invention, as the polarization controller, various units can be used as long as they can switch the light emitted from the light source 12 between two or more linearly polarized light components having different states to be incident into the diffraction grating polarizing plate 18 (the polarizing plate in the present invention).

For example, in a case where the light source 12 is a light source (light emitting element) that emits linearly polarized light), a configuration where the polarizer 14 is unnecessary and only the liquid crystal cell 16 configures the polarization controller may be adopted.

In addition, a configuration of using a polarizer (linear polarizer) and a rotating unit for the polarizer as the polarization controller and rotating the polarizer around a rotating shaft provided at the in-plane center to switch between directions of the linearly polarized light transmitted through the polarizer can also be used.

Further, in a case where the light source 12 emits linearly polarized light, a configuration of providing a rotating unit for the light source and rotating the light source around the optical axis to switch between directions of the linearly polarized light incident into the diffraction grating polarizing plate 18 can also be used.

The linearly polarized light transmitted through the liquid crystal cell 16, that is, the polarization controller is subsequently incident into the diffraction grating polarizing plate 18.

In the present invention, the polarizing plate (diffraction grating polarizing plate) functions as a diffraction grating that has two or more regions having different polarization states of transmitted light in an in-plane and where one or more regions among the regions are periodically disposed.

Figure 3:
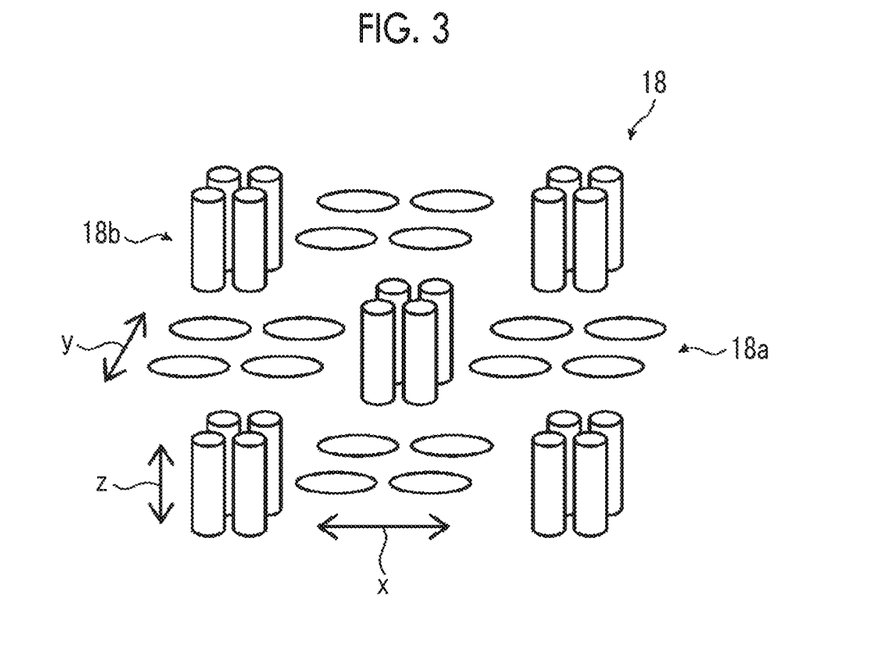
FIG. 3 is a diagram conceptually showing an example of a polarizing plate (diffraction grating polarizing plate).

In the lighting device in the example shown in the drawing, as conceptually shown in FIG. 3, the diffraction grating polarizing plate 18 has a periodic structure such as a checkered pattern (checker pattern) where the first region 18a where the dichroic substance is horizontally aligned in one direction and the second region 18b where the dichroic substance is vertically aligned are alternately two-dimensionally arranged in directions orthogonal to each other in a plane (plane direction).

The diffraction grating polarizing plate 18 functions as a diffraction grating by having the periodic structure where the first region 18a and the second region 18b are periodically disposed.

In the present invention, the horizontal alignment refers to a state where the dichroic substance (absorption axis of the dichroic substance) is aligned parallel to the surface of the diffraction grating polarizing plate 18. Note that the horizontal alignment represents not only a case where the dichroic substance is completely parallel to the surface of the diffraction grating polarizing plate 18 but also a case where the dichroic substance is in an angle range of ±5° with respect to the direction horizontal to the surface of the diffraction grating polarizing plate 18.

On the other hand, on the present invention, the vertical alignment refers to a state where the dichroic substance (absorption axis of the dichroic substance) is aligned in a direction perpendicular to, that is, orthogonal to the surface of the diffraction grating polarizing plate 18. Note that the vertical alignment represents not only a case where the dichroic substance is completely perpendicular to the surface of the diffraction grating polarizing plate 18 but also a case where the dichroic substance is in an angle range of ±5° with respect to the direction perpendicular to the surface of the diffraction grating polarizing plate 18 (with respect to the perpendicular line of the surface).

In the present invention, the expressions "horizontal" and "vertical" are not limited to the dichroic substance and the diffraction grating polarizing plate and are also applicable to a positional relationship between two materials (members) other than the dichroic substance and the diffraction grating polarizing plate.

In the following description, for the convenience of description, the alignment direction (horizontal alignment direction) of the dichroic substance in the first region 18a of the diffraction grating polarizing plate 18 will be referred to as an x direction, and a direction orthogonal to the x direction will be referred to as a y direction. In addition, a direction orthogonal to the x-y direction, a direction perpendicular to the surface of the diffraction grating polarizing plate 18 will be referred to as a z direction.

In the diffraction grating polarizing plate 18, the first region 18a is a region where the dichroic substance is horizontally aligned in the x direction. That is, the first region 18a is a region having an absorption axis in the x direction. Accordingly, in a case where linearly polarized light in the x direction is incident, the first region 18a absorbs the linearly polarized light without transmitting through the first region 18a, and in a case where linearly polarized light in the y direction orthogonal to the first region 18a is incident, the linearly polarized light transmits through the first region 18a.

On the other hand, the second region 18b of the diffraction grating polarizing plate 18 is a region where the dichroic substance is vertically aligned. That is, the second region 18b is a region having an absorption axis in the vertical direction (z direction) without having an absorption axis in the in-plane direction of the diffraction grating polarizing plate 18. Accordingly, not only in a case where linearly polarized light in the x direction is incident but also in a case where linearly polarized light in the y direction orthogonal to the second region 18b is incident, the linearly polarized light transmits through the second region 18b without being absorbed.

As described above, the diffraction grating polarizing plate 18 has the two regions where the polarization state of transmitted light varies depending on the polarization state of incident light, for example, the first region 18a where linearly polarized light in the y direction transmits and the second region 18b where linearly polarized light in both of the x direction and the y direction transmits.

Specifically, in a case where a transmittance is measured while changing a tilt angle (polar angle) and a tilt direction (azimuthal angle) with respect to the normal direction of a film (film-shaped (sheet-shaped) optical element), the absorption axis refers to a direction in which the transmittance is the highest at a wavelength of 550 nm, for example, an average value of major axis directions of the aligned dichroic substance. The transmittance measured while changing the tilt angle and the tilt direction with respect to the normal direction of the film can be measured, for example, using AxoScan OPMF-1 (manufactured by Opto Science Inc.).

As described above, in the lighting device 10, the liquid crystal cell 16, that is, the polarization controller switches the light incident into the diffraction grating polarizing plate 18 between the linearly polarized light in the x direction and the linearly polarized light in the y direction.

The linearly polarized light in the x direction is linearly polarized light in the same direction as the horizontal alignment direction of the dichroic substance in the first region 18a of the diffraction grating polarizing plate 18. The linearly polarized light in the y direction is linearly polarized light in a direction orthogonal to the x direction.

Figure 4:
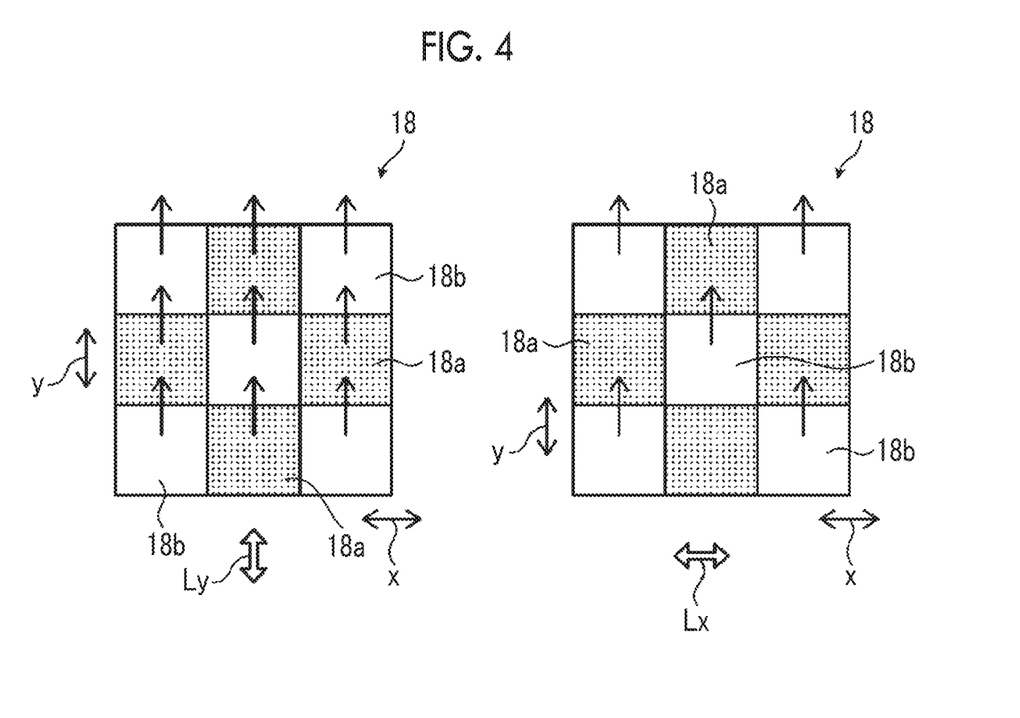
FIG. 4 is a conceptual diagram showing an action of the lighting device shown in FIG. 1.

In a case where the liquid crystal cell 16 switches the light incident into the diffraction grating polarizing plate 18 to the linearly polarized light in the y direction, as conceptually shown on the left side of FIG. 4, the linearly polarized light transmits through both of the first region 18a and the second region 18b. That is, in a case where the linearly polarized light Ly in the y direction is incident, the diffraction grating polarizing plate 18 acts as a transparent plate.

Figure 5:
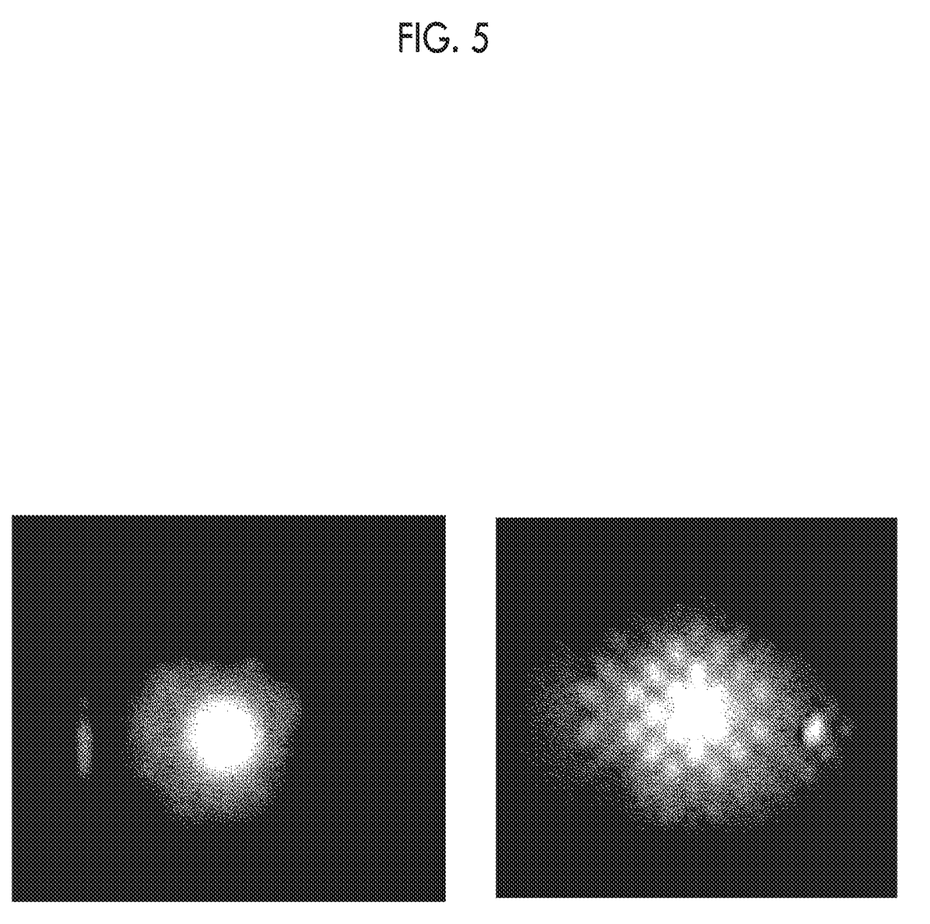
FIG. 5 is a conceptual diagram showing an action of the lighting device shown in FIG. 1.

As a result, the light emitted from the diffraction grating polarizing plate 18, that is, the emitted light of the lighting device 10 is single light as in the light emitted from the light source 12 as a point light source as conceptually shown on the lower left side of FIG. 1 and the left side of FIG. 5.

Accordingly, in a state where the liquid crystal cell 16 switches the light incident into the diffraction grating polarizing plate 18 to the linearly polarized light Ly in the y direction, the lighting device 10 is a single light source that emits single light.

On the other hand, in a case where the liquid crystal cell 16 switches the light incident into the diffraction grating polarizing plate 18 to the linearly polarized light Lx in the x direction, as conceptually shown on the right side of FIG. 4, the linearly polarized light is shielded in the first region 18a and transmits through only the second region 18b.

As described above, in the diffraction grating polarizing plate 18, the first region 18a and the second region 18b are arranged in two-dimensional directions orthogonal to each other as in the checkered pattern.

Accordingly, in a case where the linearly polarized light in the x direction is incident, the diffraction grating polarizing plate 18 has a periodic structure where the light shielding unit and the light transmitting unit are periodically two-dimensionally arranged. As a result, in a case where the linearly polarized light Lx in the x direction is incident, the diffraction grating polarizing plate 18 functions as a diffraction grating.

Specifically, the linearly polarized light Lx in the x direction transmits through the second region 18b as the light transmitting unit. Here, in a state where the linearly polarized light in the x direction is incident, the diffraction grating polarizing plate 18 has a periodic structure where the light shielding unit (first region 18a) and the light transmitting unit are alternately arranged. Therefore, in a case where the linearly polarized light in the x direction transmits through the light transmitting unit, that is, the second region 18b, the linearly polarized light in the x direction is diffracted.

The diffraction grating polarizing plate 18 is in a state where the linearly polarized light (diffracted light) transmitted through and diffracted by the light transmitting unit interferes with another linearly polarized light transmitted through the light transmitting unit adjacent thereto to be interference light and the interference light components adjacent to each other further interfere to form a dot pattern by the interference light.

As a result, the light emitted from the diffraction grating polarizing plate 18, that is, the emitted light of the lighting device 10 is a plurality of dots of light that are two-dimensionally arranged as conceptually shown on the right side of FIG. 5.

Accordingly, in a state where the liquid crystal cell 16 switches the light incident into the diffraction grating polarizing plate 18 to the linearly polarized light Lx in the x direction, the lighting device 10 is a two-dimensional dot light source that emits dot light consisting of a plurality of dots that are two-dimensionally arranged.

This dot light is formed by diffraction and interference. Therefore, the arrangement (dot pattern) of the dot light is a pattern different from the arrangement pattern of the light shielding unit and the light transmitting unit, that is, the first region 18a and the second region 18b.

In addition, the arrangement of the emitted dot light may be regular or irregular. The arrangement of the first region 18a and the second region 18b corresponding to the desired arrangement of the dot light may be obtained, for example, using a computer generated hologram.

As described above, the lighting device according to the embodiment of the present invention includes: the polarizing plate (diffraction grating) functioning as a diffraction grating that has a plurality of regions having different polarization states of transmitted light and where one or more regions among the regions are periodically arranged; and the polarization controller that switches the light emitted from the light source between the plurality of different polarization states to be incident into the polarizing plate. By allowing the polarization controller to switch between the polarization states of the light incident into the polarizing plate, the lighting device according to the embodiment of the present invention can switch between intensity distributions of the emitted light, for example, between emission of single light and emission of dot light as in the example shown in the drawing.

That is, according to the present invention, the patterning of the alignment of the liquid crystal compound in the liquid crystal cell is unnecessary, and the lighting device that can switch between intensity distributions of emitted light is provided with a simple configuration.

As described above, the diffraction grating polarizing plate 18 has the configuration where the first region 18a where the dichroic substance is horizontally aligned in one direction and the second region 18b where the dichroic substance is vertically aligned are arranged in a checkered pattern.

The diffraction grating polarizing plate 18 can be prepared, for example, by forming an alignment film on a support and forming a light absorption anisotropic film formed of a dichroic substance on the alignment film.

That is, in this example, the diffraction grating polarizing plate 18 is a laminate including the support, the alignment film, and light absorption anisotropic film. Optionally, this laminate may include a polymer film such as a polyvinyl alcohol (PVA) film acting as an oxygen barrier layer and/or a colorant dispersion preventing layer or the like that is provided on the surface of the support.

In the present invention, the diffraction grating polarizing plate 18 is not limited to the configuration.

For example, the diffraction grating polarizing plate 18 may be formed using only the light absorption anisotropic film by peeling off the support and the alignment film from the laminate. Alternatively, the diffraction grating polarizing plate 18 may be formed using the alignment film and the light absorption anisotropic film by peeling off the support from the laminate. Further, the diffraction grating polarizing plate 18 may also be formed by bonding another support substrate to the light absorption anisotropic film from which the support and the alignment film are peeled off.

As the support, various well-known supports can be used as long as they have sufficient light transmittance with respect to the corresponding light.

For example, as the support, a polymer film (for example, a polarizer protective film) or a glass substrate can be used. For uses where flexibility is required, a polymer film or a glass substrate having a thickness of 100 µm or less is preferably used.

Specific examples of a polymer forming the polymer film include: a cellulose polymer; an acrylic polymer including an acrylic acid ester polymer such as polymethyl methacrylate or a lactone ring-containing polymer; a thermoplastic norbornene polymer; a polycarbonate polymer; a polyester polymer such as polyethylene terephthalate or polyethylene naphthalate; a styrene polymer such as polystyrene or an acrylonitrile-styrene copolymer (AS resin); a polyolefin polymer such as polyethylene, polypropylene, or an ethylene-propylene copolymer; a vinyl chloride polymer; an amide polymer such as nylon or an aromatic polyamide; an imide polymer; a sulfone polymer; a polyethersulfone polymer; a polyether ether ketone polymer; a polyphenylene sulfide polymer; a vinylidene chloride polymer; a vinyl alcohol polymer; a vinyl butyral polymer; an arylate polymer; a polyoxymethylene polymer; an epoxy polymer; and a polymer obtained by mixing these polymers.

Among these, a cellulose polymer represented by triacetyl cellulose can be preferably used as the support. In the following description, the cellulose polymer will also be referred to as "cellulose acylate".

In addition, from the viewpoints of workability and optical performance, the acrylic polymer is also preferably used as the support.

Examples of the acrylic polymer include polymethyl methacrylate and a lactone ring-containing polymer and the like described in paragraphs [0017] to [0107] of JP2009-98605A.

In the present invention, from the viewpoint of reducing the thickness, an aspect where a transparent support is peeled off from an optical film is also preferable. In an aspect where a peelable polymer film is used, a cellulose polymer or a polyester polymer can be preferably used.

It is preferable that the support is transparent with respect to the corresponding light.

Here, "transparent" described in the present invention represents that the transmittance of the corresponding light is 60% or more. The transmittance of the corresponding light is preferably 80% or more and more preferably 90% or more.

The thickness of the support is not particularly limited and is preferably 40 µm or less from the viewpoint that, for example, the thickness of the optical laminate can be reduced. The lower limit is not particularly limited and is typically 5 µm or more.

Examples of the alignment film include a photo-alignment film and a rubbing aligned film.

In particular, a photo-alignment film is preferable. Examples of the photo-alignment film include examples described in paragraphs [0018] to [0078] of WO2020/179864A.

More specifically, the photo-alignment film includes a photo-alignment compound.

The photo-alignment compound is a compound having a photo-aligned group.

Here, "photo-aligned group" refers to a group having a photo-alignment function in which rearrangement or an anisotropic chemical reaction is induced by irradiation with light having anisotropy (for example, plane-polarized light), and from the viewpoint of obtaining excellent alignment uniformity and improving thermal stability and chemical stability, a photo-aligned group where at least one of dimerization or isomerization occurs by the action of light is preferable.

Specific examples of the photo-aligned group that is dimerized by the action of light include groups having a skeleton of at least derivative selected from the group consisting of cinnamic acid derivatives (M. Schadt et al., J. Appl. Phys., vol. 31, No. 7, page 2155 (1992)), coumarin derivatives (M. Schadt et al., Nature., vol. 381, page 212 (1996)), chalcone derivatives (Toshihiro Ogawa et al., Preprints of Symposium on Liquid Crystals (Ekisho Toronkai Koen Yokoshu in Japanese), 2AB03 (1997)), maleimide derivatives, and benzophenone derivatives (Y. K. Jang et al., SID Int. Symposium Digest, P-53 (1997)).

Specific examples of the photo-aligned group that is isomerized by the action of light include groups having a skeleton of at least one compound selected from the group consisting of azobenzene compounds (K. Ichimura et al., Mol. Cryst. Liq. Cryst., 298, 221 (1997)), stilbene compounds. (J. G. Victor and J. M. Torkelson, Macromolecules, 20, 2241 (1987)), spiropyran compounds (K. Ichimura et al., Chemistry Letters, page 1063 (1992); K. Ichimura et al., Thin Solid Films, vol. 235, page 101 (1993)), cinnamic acid compounds (K. Ichimura et al., Macromolecules, 30, 903 (1997)), and hydrazono-P-ketoester compounds (S. Yamamura et al., Liquid Crystals, vol. 13, No. 2, page 189 (1993)).

Examples of a method of forming the photo-alignment film include a method of applying a coating solution for forming a photo-alignment film including the above-described photo-alignment compound and irradiating the formed coating film with polarized light or with non-polarized light from a direction oblique to the coating film surface.

The polarized light to be irradiated is not particularly limited, and examples thereof include linearly polarized light, circularly polarized light, and elliptically polarized light. Among these, linearly polarized light is preferable.

In addition, the "oblique direction" in which the non-polarized light is irradiated is not particularly limited as long as it is a direction tilted by a polar angle $\theta$ ($0<\theta<90°$) with respect to the normal direction of the coating film surface, and can be appropriately selected according to the purpose, and $\theta$ is preferably 20° to 80°.

A wavelength of the polarized light or the non-polarized light is not particularly limited as long as the light is light to which the photo-aligned group is sensitive, and examples of the light include ultraviolet light, near ultraviolet light, and visible light, and near ultraviolet light having a wavelength of 250 to 450 nm is preferable.

An exposure pattern on the coating film formed by applying the coating solution for forming a photo-alignment film can be adjusted to form an alignment film having a region where a dichroic substance disposed on the alignment film is horizontally aligned in one direction and a region where a dichroic substance disposed on the alignment film is vertically aligned.

Specifically, first, the coating film formed by applying the coating solution for forming a photo-alignment film can be irradiated with polarized light or with non-polarized light from a direction oblique to the coating film surface to obtain a photo-alignment film having an alignment restriction force in the horizontal direction.

Next, the photo-alignment film having an alignment restriction force in the horizontal direction is irradiated with non-polarized light from any direction through a mask having a predetermined pattern. In the region of the alignment film irradiated with the non-polarized light, the alignment restriction force is removed. As a result, an alignment film having the region having the alignment restriction force in the horizontal direction and the region not having the alignment restriction force is formed. As described below, in a case where a composition for forming a light absorption anisotropic film including a dichroic substance and a vertical alignment agent is applied to the alignment film, the dichroic substance is horizontally aligned in one direction in the region of the alignment film having an alignment restriction force in the horizontal direction, and the dichroic substance is vertically aligned due to the function of the vertical alignment agent in the region of the alignment film not having an alignment restriction force.

The light absorption anisotropic film includes a dichroic substance.

The dichroic substance is not particularly limited, and examples thereof include a visible light absorbing material (a dichroic colorant or a dichroic azo compound), a light emitting material (a fluorescent material or a phosphorescent material), an ultraviolet absorbing material, an infrared absorbing material, a non-linear optical material, a carbon nanotube, and an inorganic material (for example, a quantum rod). Further, a well-known dichroic substance (dichroic colorant) in the related art can be used.

The dichroic substance that is particularly preferably used is a dichroic azo colorant compound.

The dichroic azo colorant compound is not particularly limited, and a well-known dichroic azo colorant in the related art can be used, but the compounds described below are preferably used.

In the present invention, the dichroic azo colorant compound represents a colorant of which absorbance varies depending on directions.

The dichroic azo colorant compound may or may not exhibit liquid crystallinity.

In a case where the dichroic azo colorant compound exhibits liquid crystallinity, the dichroic azo colorant compound may exhibit any of nematic liquid crystallinity or smectic liquid crystallinity. A temperature range where a liquid crystal phase is exhibited is preferably room temperature (about 20° C. to 28° C.) to 300° C. and more preferably 50° C. to 200° C. from the viewpoints of handleability and manufacturing suitability.

In the present invention, from the viewpoint of adjusting the tint, it is preferable that the light absorption anisotropic film at least includes at least one colorant compound having a maximal absorption wavelength in a wavelength range of 560 nm or more and less than 700 nm and at least one colorant compound having a maximal absorption wavelength in a wavelength range of 455 nm or more and less than 560 nm. In the following description, the colorant compound having a maximal absorption wavelength in a wavelength range of 560 nm or more and less than 700 nm will also be referred to as "first dichroic azo colorant compound" for the convenience of description. In addition, in the following description, the colorant compound having a maximal absorption wavelength in a wavelength range of 455 nm or more and less than 560 nm will also be referred to as "second dichroic azo colorant compound" for the convenience of description.

In the present invention, three or more kinds of dichroic azo colorant compounds may be used in combination. For example, from the viewpoint of approximating the light absorption anisotropic film to black, it is preferable that the first dichroic azo colorant compound, the second dichroic azo colorant compound, and at least one colorant compound having a maximal absorption wavelength in a wavelength range of 380 nm or more and less than 455 nm are used in combination.

In the present invention, the dichroic substance may have a polymerizable group. In particular, the dichroic azo colorant compound may have a polymerizable group.

Specific examples of the polymerizable group include a (meth)acryloyl group, an epoxy group, an oxetanyl group, and a styryl group. Among these, a (meth)acryloyl group is preferable.

As described below, the light absorption anisotropic film may be a light absorption anisotropic film that is formed using a composition for forming a light absorption anisotropic film including a dichroic substance having a polymerizable group. In the light absorption anisotropic film, the dichroic substance is immobilized by reaction of the polymerizable group in the dichroic substance.

Specific examples of the light absorption anisotropic film include those described in paragraphs [0067] to [0071] of JP2013-228706A, paragraphs [0008] to [0026] of JP2013-227532A, paragraphs [0008] to [0015] of JP2013-209367A, paragraphs [0045] to [0058] of JP2013-14883A, paragraphs [0012] to [0029] of JP2013-109090A, paragraphs [0009] to [0017] of JP2013-101328A, paragraphs [0051] to [0065] of JP2013-37353A, paragraphs [0049] to [0073] of JP2012-63387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0005] to [0041] of WO2016/060173A, paragraphs [0008] to [0062] of WO2016/136561A, paragraphs [0014] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

The light absorption anisotropic film may include a liquid crystal compound other than the dichroic substance. By including the liquid crystal compound, the dichroic substance can be aligned with a high alignment degree.

As the liquid crystal compound, any of a low-molecular-weight liquid crystal compound or a polymer liquid crystal compound can also be used, and it is preferable that both of the compounds are used in combination. Here, "low-molecular-weight liquid crystal compound" refers to a liquid crystal compound not including a repeating unit in a chemical structure. In addition, "polymer liquid crystal compound" refers to a liquid crystal compound including a repeating unit in a chemical structure.

From the viewpoint of further improving the alignment degree, it is preferable that the liquid crystal compound is a polymer liquid crystal compound including a repeating unit represented by the following Formula (1L) (hereinafter, also referred to as a repeating unit (1L)).

(1L)

In Formula (1L), P1 represents the main chain of the repeating unit, L1 represents a single bond or a divalent linking group, SP1 represents a spacer group, M1 represents a mesogenic group, and T1 represents a terminal group.

Specific examples of the main chain of the repeating unit represented by P1 include groups represented by the following Formulae (P1-A) to (P1-D). In particular, the group represented by the following Formula (P1-A) is preferable from the viewpoint of diversity of monomers as raw materials and handleability.

In Formulae (P1-A) to (P1-D), "*" represents a bonding position to L1 in Formula (1L). In Formulae (P1-A) to (P1-D), $R^1$, $R^2$, $R^3$, and $R^4$ each independently represent a hydrogen atom, a halogen atom, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms in the alkyl group is preferably 1 to 5.

It is preferable that the group represented by Formula (P1-A) is one unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound having an epoxy group.

It is preferable that the group represented by Formula (P1-C) is a propylene glycol unit formed by ring-opening polymerization of an oxetane group of a compound having an oxetane group.

It is preferable that the group represented by Formula (P1-D) is a siloxane unit of polysiloxane obtained by polycondensation of a compound having at least one group of an alkoxysilyl group or a silanol group. Here, examples of the compound having at least one group of an alkoxysilyl group or a silanol group include a compound having a group represented by Formula $SiR^4(OR^5)_2$—. In the formula, $R^4$ has the same definition as $R^4$ in Formula (P1-D), and a plurality of $R^5$'s each independently represent a hydrogen atom or an alkyl group having 1 to 10 carbon atoms.

L1 represents a single bond or a divalent linking group.

Examples of the divalent linking group represented by L1 include —C(O)O—, —O—, —S—, —C(O)NR$^3$—, —SO$_2$—, and —NR$^3$R$^4$—. In the formula, $R^3$ and $R^4$ each independently represent a hydrogen atom or an alkyl group having 1 to 6 carbon atoms which may have a substituent.

In a case where P1 represents a group represented by Formula (P1-A), from the viewpoint of further improving the alignment degree, it is preferable that L1 represents a group represented by —C(O)O—.

In a case where P1 represents a group represented by any of Formulae (P1-B) to (P1-D), from the viewpoint of further improving the alignment degree, it is preferable that L1 represents a single bond.

From the viewpoint that liquid crystallinity can be easily exhibited or raw material availability can be achieved, it is preferable that the spacer group represented by SP1 includes at least one structure selected from the group consisting of an oxyethylene structure, an oxypropylene structure, a polysiloxane structure, and a fluorinated alkylene structure.

Here, it is preferable that the oxyethylene structure represented by SP1 is a group represented by *—(CH$_2$—CH$_2$O)$_{n1}$—*. In the formula, n1 represents an integer of 1 to 20, and "*" represents a bonding position to L1 or M1 in Formula (1L). From the viewpoint of further improving the alignment degree, n1 represents preferably an integer of 2 to 10, more preferably an integer of 2 to 4, and still more preferably 3.

Further, from the viewpoint of further improving the alignment degree, a group represented by *—(CH(CH$_3$)—CH$_2$O)$_{n2}$—* is preferable as the oxypropylene structure represented by SP1. In the formula, n2 represents an integer of 1 to 3, and * represents a bonding position to L1 or M1.

Further, from the viewpoint of further improving the alignment degree, a group represented by *—(Si(CH$_3$)$_2$—O)$_{n3}$—* is preferable as the polysiloxane structure represented by SP1. In the formula, n3 represents an integer of 6 to 10, and * represents a bonding position to L1 or M1.

Further, from the viewpoint of further improving the alignment degree, a group represented by *—(CF$_2$—CF$_2$)$_{n4}$—* is preferable as the fluorinated alkylene structure represented by SP1. In the formula, n4 represents an integer of 6 to 10, and * represents a bonding position to L1 or M1.

The mesogenic group represented by M1 is a group representing a main skeleton of liquid crystal molecules contributing to liquid crystal formation. The liquid crystal molecules exhibit liquid crystallinity in an intermediate state (mesophase) between a crystal state and an isotropic liquid state. The mesogenic group is not particularly limited, and the details can be found in, for example, particularly the description in pages 7 to 16 of "Flussige Kristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystal Handbook Editing Committee.

As the mesogenic group, for example, a group having at least one cyclic structure selected from the group consisting of an aromatic hydrocarbon group, a heterocyclic group, and an alicyclic group is preferable.

From the viewpoint of further improving the alignment degree, the mesogenic group includes preferably an aromatic hydrocarbon group, more preferably 2 to 4 aromatic hydrocarbon groups, and still more preferably 3 aromatic hydrocarbon groups.

From the viewpoints of exhibiting the liquid crystallinity, adjusting the liquid crystal phase transition temperature, and the availability of raw materials and synthesis suitability and from the viewpoint of further improving the alignment degree, a group represented by Formula (M1-A) or Formula (M1-B) is preferable, and a group represented by Formula (M1-B) is more preferable as the mesogenic group.

$$*{+}(A1)_{\overline{a1}}*$$ (M1-A)

$$*{+}(A2-LA1)_{\overline{a2}}A3{-}*$$ (M1-B)

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, or an alkoxy group.

It is preferable that the divalent group represented by A1 is a 4-membered to 6-membered ring. In addition, the divalent group represented by A1 may be a monocycle or a fused ring.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoints of the diversity of design of the mesogen skeleton and raw material availability, a phenylene group or a naphthylene group is preferable, and a phenylene group is more preferable.

The divalent heterocyclic group represented by A1 may be any of aromatic or nonaromatic, but a divalent aromatic heterocyclic group is preferable from the viewpoint of further improving the alignment degree.

Examples of an atom other than carbon forming the divalent aromatic heterocyclic group include a nitrogen atom, a sulfur atom, and an oxygen atom. In a case where the aromatic heterocyclic group has a plurality of atoms forming the ring other than carbon, the atoms may be the same as or different from each other.

In Formula (M1-A), a1 represents an integer of 1 to 10. In a case where a1 represents 2 or more, a plurality of A1's may be the same as or different from each other.

In Formula (M1-B), A2 and A3 each independently represent a divalent group selected from the group consisting of an aromatic hydrocarbon group, a heterocyclic group, and an alicyclic group.

In Formula (M1-B), a2 represents an integer of 1 to 10, and in a case where a2 represents 2 or more, a plurality of A2's may be the same as or different from each other, a plurality of A3's may be the same as or different from each other, and a plurality of LA1's may be the same as or different from each other. From the viewpoint of further improving the alignment degree, a2 represents preferably an integer of 1 or more and more preferably 2.

In Formula (M1-B), in a case where a2 represents 1, LA1 represents a divalent linking group. In a case where a2 represents 2 or more, a plurality of LA1's each independently represent a single bond or a divalent linking group, and at least one of a plurality of LA1's represents a divalent linking group. In a case where a2 represents 2, from the viewpoint of further improving the alignment degree, it is preferable that one of two LA1's represents a divalent linking group and the other one represents a single bond.

In Formula (M1-B), examples of the divalent linking group represented by LA1 include —O—, —(CH$_2$)$_g$—, —(CF$_2$)$_g$—, —Si(CH$_3$)$_2$—, —Si(CH$_3$)$_2$O)$_g$—, —(OSi(CH$_3$)$_2$)$_g$— (g represents an integer of 1 to 10), —N(Z)—, —C(Z)=C(Z')—, —C(Z)=N—, —N=C(Z)—, —C(Z)$_2$—C(Z')$_2$—, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z")—, —C(Z)=C(Z')—C(O)—S—, —S—C(O)—C(Z)=C(Z)—, and —C(Z)=N—N=C(Z')— (Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, —C(O)O— is preferable from the viewpoint of further improving the alignment degree. LA1 may represent a group including a combination of two or more of the above-described groups.

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group; specific examples of the linking group are the same as those of L1 and SP1; and A represents a (meth)acryloyloxy group).

From the viewpoint of further improving the alignment degree, the content of the repeating unit (1L) is preferably 20 mass % to 100 mass % with respect to 100 mass % of all repeating units of the polymer liquid crystal compound.

In a case where the polymer liquid crystal compound has two kinds of the repeating units (1L), from the viewpoint of further improving the alignment degree, it is preferable that the terminal group represented by T1 in one unit (repeating unit A) is an alkoxy group and the terminal group represented by T1 in the other unit (repeating unit B) is a group other than the alkoxy group.

From the viewpoint of further improving the alignment degree, as the terminal group represented by T1 in the repeating unit B, an alkoxycarbonyl group, a cyano group, or a (meth)acryloyloxy group-containing group is preferable, and an alkoxycarbonyl group or a cyano group is more preferable.

From the viewpoint of further improving the alignment degree, a ratio (A/B) of the content of the repeating unit A with respect to the total mass of the polymer liquid crystal compound to the content of the repeating unit B with respect to the total mass of the polymer liquid crystal compound is preferably 50/50 to 95/5, more preferably 60/40 to 93/7, and still more preferably 70/30 to 90/10.

Further, the polymer liquid crystal compound may include a repeating unit not having a mesogenic group in addition to the repeating unit (1L). Examples of the repeating unit not having a mesogenic group include a repeating unit in which M1 in Formula (1L) represents a single bond.

In a case where the polymer liquid crystal compound includes a repeating unit not having a mesogenic group, from the viewpoint of further improving the alignment degree, the content of the repeating unit is preferably more than 0 mass % and 30 mass % or less and more preferably more than 10 mass % and 20 mass % or less with respect to 100 mass % of all the repeating units in the polymer liquid crystal compound.

From the viewpoint of further improving the alignment degree, the weight-average molecular weight (Mw) of the polymer liquid crystal compound is preferably 1000 to 500000 and more preferably 2000 to 300000. In a case where Mw of the polymer liquid crystal compound is in the above-described range, the polymer liquid crystal compound can be easily handled.

In particular, from the viewpoint of suppressing cracking during application, the weight-average molecular weight (Mw) of the polymer liquid crystal compound is preferably 10000 or higher and more preferably 10000 to 300000.

In addition, from the viewpoint of the temperature latitude of the alignment degree, the weight-average molecular weight (Mw) of the polymer liquid crystal compound is preferably lower than 10000 and more preferably 2000 or higher and lower than 10000.

Here, the weight-average molecular weight and the number-average molecular weight in the present invention are values measured by gel permeation chromatography (GPC).

Solvent (eluent): N-methylpyrrolidone
Device name: TOSOH HLC-8220GPC
Column: Three TOSOH TSKgel Super AWM-H's (6 mm×15 cm) connected together
Column temperature: 25° C.
Sample concentration: 0.1 mass %
Flow rate: 0.35 mL/min
Calibration curve: a calibration curve obtained using seven samples of TSK standard polystyrene (manufactured by TOSOH Corporation) at Mw=2800000 to 1050 (Mw/Mn=1.03 to 1.06)

It is preferable that the light absorption anisotropic film includes a surfactant.

By including the surfactant, the smoothness of the coating surface is further improved, the alignment degree is improved, cissing and unevenness are suppressed, and the effect of improving in-plane uniformity is expected.

As the surfactant, a surfactant that aligns the dichroic colorant compound and the liquid crystal compound to be horizontal to (horizontal alignment agent) or perpendicular to (vertical alignment agent) each other on the coating surface side may be used. For example, a compound described in paragraphs [0155] to [0170] of WO2016/009648A, a compound (horizontal alignment agent) described in paragraphs [0253] to [0293] of JP2011-237513A, or a compound (vertical alignment agent) described in paragraphs "0071" to "0097" of WO2019/235355A can be used.

Examples of a method of forming the light absorption anisotropic film include a method including, in the following order: a step of applying a composition for forming a light absorption anisotropic film including a dichroic substance and a liquid crystal compound to an alignment film to form a coating film (hereinafter, also referred to as "coating film forming step"); and a step (hereinafter, also referred to as "alignment step") of aligning a liquid crystal component in the coating film.

In a case where the above-described dichroic substance has liquid crystallinity in addition to the above-described liquid crystal compound, the liquid crystal component is a component that also includes the dichroic substance having liquid crystallinity.

The composition for forming a light absorption anisotropic film includes the dichroic substance and the liquid crystal compound described above.

The composition for forming a light absorption anisotropic film may include a surfactant, a polymerization initiator, and a solvent.

In the coating film forming step, specific examples of a method of applying the composition for forming a light absorption anisotropic film include well-known methods such as a roll coating method, a gravure printing method, a spin coating method, a wire bar coating method, an extrusion coating method, a direct gravure coating method, a reverse gravure coating method, a die coating method, a spraying method, and an ink jet method.

The alignment step is a step of aligning the liquid crystal component in the coating film. In this manner, the light absorption anisotropic film is obtained.

The alignment step may include a drying treatment. Through the drying treatment, a component such as the solvent may be removed from the coating film. The drying treatment may be performed using a method (for example, natural drying) of leaving the coating film to stand at room temperature for a predetermined time, or may be performed a method of performing heating and/or blowing.

Here, the liquid crystal component in the composition for forming a light absorption anisotropic film may be aligned in the coating film forming step or the drying treatment described above. For example, in an aspect where the composition for forming a light absorption anisotropic film is prepared as a coating solution including a solvent, a coating film having light absorption anisotropy, that is, a light absorption anisotropic film is obtained by drying the coating film and removing the solvent from the coating film.

The temperature of transition of the liquid crystal component in the coating film into a liquid crystal phase is preferably 10° C. to 250° C. and more preferably 25° C. to 190° C. from the viewpoints of manufacturing suitability.

It is preferable that the alignment step includes a heating treatment. As a result, since the liquid crystal component in the coating film can be aligned, the heated coating film can be suitably used as the light absorption anisotropic film.

The heating treatment is performed preferably in 10° C. to 250° C. and more preferably 25° C. to 190° C. from the viewpoint of manufacturing suitability. In addition, the heating time is preferably 1 to 300 seconds and more preferably 1 to 60 seconds.

Optionally, a step of curing the light absorption anisotropic film may be performed after the alignment step. Hereinafter, this step will also be referred to as "curing step".

For example, in a case where the light absorption anisotropic film has a crosslinkable group (polymerizable group), the curing step is performed by heating and/or light irradiation (exposure). In particular, it is preferable that the curing step is performed by light irradiation.

As described above, the diffraction grating polarizing plate 18 has the configuration where the first region 18a where the dichroic substance is horizontally aligned in one direction and the second region 18b where the dichroic substance is vertically aligned are alternately two-dimensionally arranged in a checkered pattern.

In the present invention, as the arrangement pattern of the first region 18a and the second region 18b, various arrangement patterns other than the above-described pattern can be used as long as they have a periodic arrangement pattern, that is, a periodic structure that functions as a diffraction grating.

Examples of the arrangement pattern of the first region 18a and the second region 18b other than the checkered pattern include a stripe arrangement pattern.

Alternatively, a so-called sea-island configuration where only the first region 18a is one-dimensionally or two-dimensionally periodically arranged and the other region is all the second region 18b can also be used. For example, a polka-dot pattern where a plurality of circular (substantially circular) first regions 18a are periodically formed or a lattice pattern where a plurality of quadrangular (substantially quadrangular) first regions 18a are periodically formed can be used.

In addition, an arrangement interval of the first region 18a and the second region 18b in the diffraction grating polarizing plate 18, that is, a period of the periodic structure is not also particularly limited, and an interval (period) where the diffraction grating polarizing plate 18 can function as a diffraction grating may be appropriately set depending on the arrangement pattern or the like.

The arrangement interval of the first region 18a and the second region 18b is preferably 50 μm or less, more preferably 30 μm or less, and still more preferably 20 μm or less.

In the lighting device 10 in the example shown in the drawing, in the diffraction grating polarizing plate 18, the first region 18a where the dichroic substance is horizontally aligned and the second region 18b where the dichroic substance is vertically aligned are periodically arranged. In the present invention, the diffraction grating (polarizing plate) is not limited to this configuration.

That is, in the present invention, the polarizing plate can use various configurations as long as it functions as a diffraction grating that has two or more regions having different polarization states of transmitted light in an in-plane direction and where one or more regions among the regions are periodically disposed.

As described above, the lighting device according to the embodiment of the present invention switches the polarized light incident into the polarizing plate (diffraction grating polarizing plate) to switch between the shielding and the transmission of the incident polarized light in the plurality of regions arranged in the polarizing plate. Due to the switching, the lighting device according to the embodiment of the present invention switches between a state where the polarizing plate acts as a diffraction grating and a state where the polarizing plate does not act as a diffraction grating or switches between states where the polarizing plate acts as different diffraction gratings.

As a result, the lighting device according to the embodiment of the present invention switches between intensity distributions of emitted light.

Accordingly, in the lighting device according to the embodiment of the present invention, the polarizing plate (diffraction grating polarizing plate) can use various configurations as long as, in a case where light is incident, it depends on a polarization state of the light and has a structure where a region where the polarized light transmits and a region where the polarized light is shielded are provided and one or more regions among the regions are periodically arranged.

For example, in the diffraction grating polarizing plate 18 including the first region 18a where the dichroic substance is horizontally aligned and the second region 18b where the dichroic substance is vertically aligned, the dichroic substance in the second region 18b is dissolved and this region is the same as an isotropic region, that is, an optically transparent state.

As a method of dissolving the dichroic substance of the second region 18b, various well-known methods such as a method of using heat exposure through a heat shield mask or a method of generating a difference in solubility in a solvent between the exposed portion and the non-exposed portion during ultraviolet exposure (UV exposure) through a light blocking mask can be used. Examples of the method of generating a difference in solubility in a solvent between the exposed portion and the non-exposed portion include a method of stereo-crosslinking a double bond group (for example, an acrylic group or a methacrylic group) using a photoradical polymerization initiator to decrease the solubility in a solvent.

In addition, as the polarizing plate, a configuration where the same region as the first region 18a where the dichroic substance is horizontally aligned on the entire surface is formed and a region corresponding to the second region 18b is punched can also be used.

As another polarizing plate, for example, a configuration of using a cholesteric liquid crystal layer obtained by immobilizing a cholesteric liquid crystalline phase can be used. Specifically, for example, a polarizing plate that has a region consisting of a cholesteric liquid crystal layer and an isotropic region and where at least the region consisting of a cholesteric liquid crystal layer is periodically disposed can be used.

As is well known, the cholesteric liquid crystalline phase selectively reflects circularly polarized light having a predetermined turning direction in a predetermined wavelength range, and allows transmission of the other light. Accordingly, the polarization controller switches the light incident into the polarizing plate between the circularly polarized light to be selectively reflected from the cholesteric liquid crystal layer and linearly polarized light to switch between intensity distributions of emitted light, for example, between a point light source and a two-dimensional dot light source as described above.

As the polarization controller that switches the light incident into the polarizing plate between the circularly polarized light and the linearly polarized light, a well-known method can be used. For example, a configuration in which, using a linear polarizer and an in-plane switching (IPS) liquid crystal cell, a slow axis direction in a plane of the liquid crystal cell switches between a direction in which a retardation is $\lambda/4$ and a direction in which a retardation is not $\lambda/4$ to switch light incident into the polarizing plate between circularly polarized light and linearly polarized light can be used.

Further, as the polarizing plate, a polarizing plate where a wire grid is patterned such that a polarization state of transmitted light varies between regions can also be used.

In addition, the polarizing plate may reflect and shield light without absorbing and shielding light.

In the above-described example, the polarization controller causes two light components having different polarization states to be incident into the diffraction grating polarizing plate 18, and the diffraction grating polarizing plate 18 has two regions including the first region 18a and the second region 18b having different transmission states of transmitted light. However, the present invention is not limited to this configuration.

That is, in the lighting device according to the embodiment of the present invention, the polarization controller may cause three or more light components having different polarization states to be incident into the polarizing plate, and/or the polarizing plate may have three or more regions having different transmission states of transmitted light.

For example, the lighting device according to the embodiment of the present invention may adopt the configuration where the polarization controller may cause three light components having different polarization states to be incident into the polarizing plate and the polarizing plate may have three regions having different transmission states of transmitted light, so as to switch between a state of a single light source that emits single light the same as light emitted from the light source 12, a state of a first two-dimensional dot light source that emits dot light consisting of a plurality of dots that are two-dimensionally arranged, and a state of a second two-dimensional dot light source that emits dot light in an arrangement different from the first two-dimensional dot light source.

Hitherto, the lighting device according to the embodiment of the present invention has been specifically described. However, the present invention is not limited to the examples described above. It goes without saying that the present invention may be ameliorated or modified in various ways, within a scope that does not depart from the gist of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Examples

<<Preparation of Polarizing Plate>>
<Preparation of Support>

As a support, a TAC substrate (TG40, manufactured by Fujifilm Corporation) having a thickness of 40 μm was prepared. A polymer coating solution having the following composition was continuously applied to the TAC substrate using a #8 wire bar. Next, by drying the coating film with hot air at 100° C. for 2 minutes, a support where a polyvinyl alcohol film having a thickness of 0.8 μm was formed on the TAC substrate was obtained.

Modified polyvinyl alcohol was added to the following polymer coating solution such that the solid content concentration was 4 mass %.

| Composition of Polymer Coating Solution The following modified polyvinyl alcohol | |
|---|---|
| Water | 70 parts by mass |
| Methanol | 30 parts by mass |

Modified Polyvinyl Alcohol

<Formation of Alignment Film>

41.6 parts by mass of butoxyethanol, 41.6 parts by mass of dipropylene glycol monomethyl, and 15.8 parts by mass of pure water were added to 1 part by mass of a photo-alignment material E-1 having the following structure, and the obtained solution was filtered under pressure through a 0.45 μm membrane filter to prepare a coating solution for forming a photo-alignment film.

Next, the obtained coating solution for forming a photo-alignment film was applied to the prepared support and was dried at 60° C. for 1 minute. Next, the obtained coating film was irradiated with linearly polarized ultraviolet light (illuminance: 4.5 mW/cm², cumulative irradiation dose: 300 mJ/cm²) using a polarized ultraviolet exposure device (first light irradiation) to prepare a photo-alignment film having an alignment restriction force in the horizontal direction.

Next, the obtained photo-alignment film was irradiated with non-polarized ultraviolet light (illuminance: 4.5 mW/cm², cumulative irradiation dose: 2000 mJ/cm²) from a direction perpendicular to the film surface through a photo mask (second light irradiation) to prepare a photo-alignment film including a pattern-exposed photo-alignment film.

The mask pattern of the photo mask was a mask pattern having a checkered pattern where a lattice size of one side was 20 μm.

E-1

<Preparation of Light Absorption Anisotropic Film>

A composition F1 for forming a light absorption anisotropic film having the following composition was continuously applied to the obtained pattern-exposed photo-alignment film using a wire bar to form a coating layer F.

Next, the coating layer F was heated at 140° C. for 15 seconds, and was cooled to room temperature (23° C.).

Next, the coating layer was heated at 75° C. for 60 seconds and cooled to room temperature again.

Next, the coating layer was irradiated with ultraviolet light using an LED lamp (central wavelength: 365 nm) for 2 seconds under an irradiation condition of an illuminance of

200 mW/cm² to form a light absorption anisotropic film. As a result, a laminate including the TAC substrate (transparent support), the PVA polymer film, the photo-alignment film, and the light absorption anisotropic film adjacent to each other in this order was prepared.

The film thickness of the light absorption anisotropic film was 2.0 μm.

Composition of Composition F1 for Forming Light Absorption Anisotropic Film

| | |
|---|---|
| The following dichroic substance C-1 | 0.65 parts by mass |
| The following dichroic substance M-1 | 0.15 parts by mass |
| The following dichroic substance Y-1 | 0.52 parts by mass |
| The following liquid crystal compound L-1 | 2.68 parts by mass |
| The following liquid crystal compound L-2 | 1.15 parts by mass |
| Polymerization initiator IRGACURE OXE-02 (manufactured by BASF SE) | 0.17 parts by mass |
| The following surfactant S-1 | 0.018 parts by mass |
| The following surfactant S-2 | 0.002 parts by mass |
| Cyclopentanone | 92.14 parts by mass |
| Benzyl alcohol | 2.36 parts by mass |

Dichroic Substance C-1 (Maximal Absorption Wavelength: 570 nm)

Dichroic Substance M-1 (Maximal Absorption Wavelength: 466 nm)

Dichroic Substance Y-1 (Maximal Absorption Wavelength: 417 nm)

Liquid Crystal Compound L-1

Liquid Crystal Compound L-2 (in the Following Formulae, Numerical Values Represent a Mass Ratio)

Surfactant S-1

Surfactant S-2

For the prepared laminate, an absorption axis direction was detected.

As described above, in a case where a transmittance is measured while changing a tilt angle and a tilt direction with respect to the normal direction of a film, the absorption axis refers to a direction in which the transmittance is the highest at a wavelength of 550 nm, for example, an average value of major axis directions of molecules of the aligned dichroic substance.

In this example, the transmittance measured while changing the tilt angle and the tilt direction with respect to the normal direction of the film was measured using AxoScan OPMF-1 (manufactured by Opto Science Inc.), and the direction of the absorption axis was detected.

As a result, it was able to be verified that a region A where the absorption axis was parallel to the surface of the alignment film and a region B where the absorption axis was perpendicular to the surface of the alignment film were formed on the light absorption anisotropic film according to the mask pattern (checkered pattern) of the photo mask through which the photo-alignment film was exposed.

That is, it was verified that the laminate is the polarizing plate (diffraction grating polarizing plate) according to the embodiment of the present invention where the region where the dichroic substance is vertically aligned and the region where the dichroic substance is horizontally aligned are periodically provided.

<<Preparation of Liquid Crystal Cell Configuring Polarization Controller>>

By using two glass substrates as insulating substrates, a common electrode and an alignment film were formed in this order on surfaces of both of the glass substrates. The common electrode was formed of ITO, in which a solid electrode was uniformly formed over the entire main surface of the glass substrate. The alignment film was a horizontal alignment film of a polyimide light-transmitting resin.

A light-transmitting spacer having a predetermined height was provided on one alignment film.

The glass substrates where the common electrode and the alignment film were formed were disposed such that the alignment film sides faced each other and the alignment films were spaced at a given gap (interval) by a spacer. Further, side edge portions of the insulating substrates were sealed with a sealing material, and the pair of glass substrates were fixed.

After filling the gap formed between the alignment film with a liquid crystal material, the gap was airtightly sealed to obtain a liquid crystal cell. A terminal was provided in the common electrode of the prepared liquid crystal cell and was connected to a drive circuit such that a predetermined voltage was applicable.

In the obtained liquid crystal cell, during voltage non-application, the liquid crystal material in the cell of the gap was in a predetermined alignment state due to the alignment restriction force of the alignment film, and during voltage application, the liquid crystal molecules were aligned in the thickness direction of the liquid crystal cell due to the action of an electric field.

During voltage non-application, an in-plane retardation Re(550) was 279 nm, and during voltage application, an in-plane retardation was 0 nm.

<<Preparation of Lighting Device>>

A polyvinyl alcohol linear polarizer (polarizer prepared by adsorbing iodine to polyvinyl alcohol and stretching the film) and the liquid crystal cell were laminated to configure a polarization controller.

In addition, as a light source, a green laser pointer ($\lambda$: 532 nm) was used.

Further, the light source, the polarization controller, and the polarizing plate (diffraction grating polarizing plate) were disposed in this order to prepare a lighting device. The polarization controller was disposed such that the linear polarizer was on the light source side. In addition, the polarizing plate was disposed such that the TAC substrate was on the polarization controller side.

By lighting the light source and switching on and off the application of the voltage to the liquid crystal cell of the polarization controller, the lighting device was able to switch between a state of a single light source that emits single light the same as light emitted from the light source and a state of a two-dimensional dot light source that emits dot light consisting of a plurality of dots that are two-dimensionally arranged.

As can be seen from the above results, the effects of the present invention are obvious.

The present invention is suitably applicable to various uses, for example, a device that can switch between a distance measurement device and an authentication device.

EXPLANATION OF REFERENCES

10: lighting device
12: light source
14: polarizer
16: liquid crystal cell
18: polarizing plate (diffraction grating polarizing plate)
18a: first region
18b: second region
100: liquid crystal cell
110: first substrate
111: insulating substrate
113: first common electrode
114: alignment film
120: second substrate
121: insulating substrate
122: second common electrode
123: alignment film
130: liquid crystal layer

What is claimed is:

1. A lighting device comprising:
a light source;
a polarization controller; and
a polarizing plate,
wherein the polarization controller switches light emitted from the light source to one of at least two different polarization states such that the light is incident into the polarizing plate, the light having a same polarization state in an entire area in an in-plane direction,
the polarizing plate functions as a diffraction grating that has two or more regions having different polarization states of transmitted light in an in-plane direction and where one or more regions among the regions are periodically disposed, and
the polarizing plate has a region in which a dichroic substance is aligned parallel to a surface of the polarizing plate, and a region in which the dichroic substance is aligned perpendicularly to the surface of the polarizing plate.

2. The lighting device according to claim 1,
wherein the polarizing plate has the two or more regions where directions of absorption axes are different from each other.

3. The lighting device according to claim 2,
wherein the polarization controller is disposed on the light source side further than the polarizing plate and includes a polarizer and a liquid crystal cell in this order from the light source side.

4. The lighting device according to claim 1,
wherein the polarization controller is disposed on the light source side further than the polarizing plate and includes a polarizer and a liquid crystal cell in this order from the light source side.

* * * * *